United States Patent
Andrews et al.

[11] Patent Number: 5,967,576
[45] Date of Patent: Oct. 19, 1999

[54] UNIVERSAL CAKE TURNER

[76] Inventors: Ruth Andrews; Jesse J. Andrews, both of 21792 Sedlack Rd., Silverhill, Ala. 36576-0204

[21] Appl. No.: 09/062,425

[22] Filed: Apr. 17, 1998

[51] Int. Cl.⁶ ..................................................... A47J 45/10
[52] U.S. Cl. ............................................. 294/34; 294/26.5
[58] Field of Search ........................... 294/7, 9, 10, 26.5, 294/27.1, 29, 32–34, 49, 51, 56; D7/688–692

[56] References Cited

U.S. PATENT DOCUMENTS

| | | | |
|---|---|---|---|
| 481,986 | 9/1892 | Waldron | 294/34 |
| 955,428 | 4/1910 | Panasci | 294/34 |
| 1,137,896 | 5/1915 | Poundstone | 294/34 X |
| 1,241,448 | 9/1917 | Sherman | 294/34 X |
| 1,983,168 | 12/1934 | Criner | 294/34 |
| 2,173,709 | 9/1939 | Campbell | 294/34 |
| 2,333,564 | 11/1943 | Hargrave | 294/29 |
| 2,462,672 | 2/1949 | Portner . | |
| 2,485,521 | 10/1949 | Wendt | 294/7 |
| 2,641,496 | 6/1953 | Benezet et al. | 294/1.1 |
| 2,696,177 | 12/1954 | Anello et al. | 294/26.5 |
| 2,862,754 | 12/1958 | Forcia et al. | 294/1 |
| 2,992,848 | 7/1961 | Livensparger | 294/34 |
| 4,076,297 | 2/1978 | McFarland | 294/7 |
| 5,213,384 | 5/1993 | Baker | 294/7 |

*Primary Examiner*—Johnny D. Cherry
*Attorney, Agent, or Firm*—Joseph N. Breaux

[57] ABSTRACT

A utensil which provides a universal device for removing a bake pan from a hot oven and also inverting the pan to facilitate removal of the cake from the pan. The device is adaptable to a variety of pan dimensions including a tube type bake pan. The device also allows cakes to be removed from pans without damaging the cake itself and is designed to prevent bakers from burning themselves due to frequent handling of hot baking pans. The device includes a flat circular shaped base with an extended handle, which is placed over a hot baking pan top and clamped into position by a slidable spring loaded clamping block. After clamping the device to the top of a hot bake pan, the pan is easily and safely removed from a hot oven, and, while the device is still attached, the pan is then inverted to facilitate removal of the cake from the pan.

7 Claims, 1 Drawing Sheet

UNIVERSAL CAKE TURNER

TECHNICAL FIELD

The present invention relates to a device which allows for efficiently and easily extracting a cake from a cake pan and more particularly to a device which can be utilized to both remove a hot cake pan from an oven and remove the cake from the pan. The device quickly clamps onto the cake pan top edge allowing the cake pan to be removed from the hot oven, and while remaining clamped, the device also allows the cake pan to be inverted thus extracting the cake from the pan, without damaging the cake or burning the user's hands.

BACKGROUND ART

The art of baking is ancient; numerous devices have been developed for practicing the art including devices for effectively removing baking pans from a hot oven. These prior devices are extremely practical and useful, however prior to the present invention there has never existed a device which both assists a baker in removing a hot baking pan from an oven and allows the baker to then invert the baking pan in order to remove the cake from the hot baking pan.

There have been numerous Baker's Peels developed, such as Baker, U.S. Pat. No. 5,213,384, which include long handles for reaching deep into a hot oven and a streamlined design for slipping under the baking dish and quickly extracting the pan from the oven. These devices will always have their place in the bakery. The present device would not only allow for the rapid extraction of the hot baking pan by clamping to the pan top edge, but also allow the cake to be extracted while the baking pan is hot, with no hand contact.

GENERAL SUMMARY DISCUSSION OF INVENTION

It is thus an object of the invention to provide a universal cake turner that includes a circular planar member which is dimensioned to be larger than the diameter of a top edge of a baking pan and which includes a pair of clamping blocks, one clamping block stationary mounted to the planar member and the other clamping block slidable mounted to the circular planar member, while an ergonomic handle extends from the circular member and includes a control means for the slidable clamping block. The circular member is placed over the hot pan top edge and the slidable clamping block locks against the top edge outer surface thereby clamping the hot pan to the circular member; the hot pan is then extracted from the hot oven with no hand contact. While out of the oven, the device remains clamped to the pan and the pan with the device are inverted allowing gravity to assist in removing the cake from the pan.

It is a further object of the invention to provide a universal cake turner that allows hot cake pans to be removed from a hot oven without burning the baker's hands, while also in the same extraction operation allowing the cake pan to be inverted to extract the cake from the pan without damaging the cake in the removal process.

It is a still further object of the invention to provide a universal cake turner that is quickly clamped to a hot tube type baking pan allowing the tube type baking pan to be removed from the hot oven and then inverted to remove the cake from the tube type cake pan.

Accordingly, a universal cake turner is provided which allows a cake pan, including a tube type cake pan, to be removed from a hot oven without burning the hands of the baker and in the same operation inverting the cake pan thereby extracting the cake from the pan without damaging the cake or burning the user's hand.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
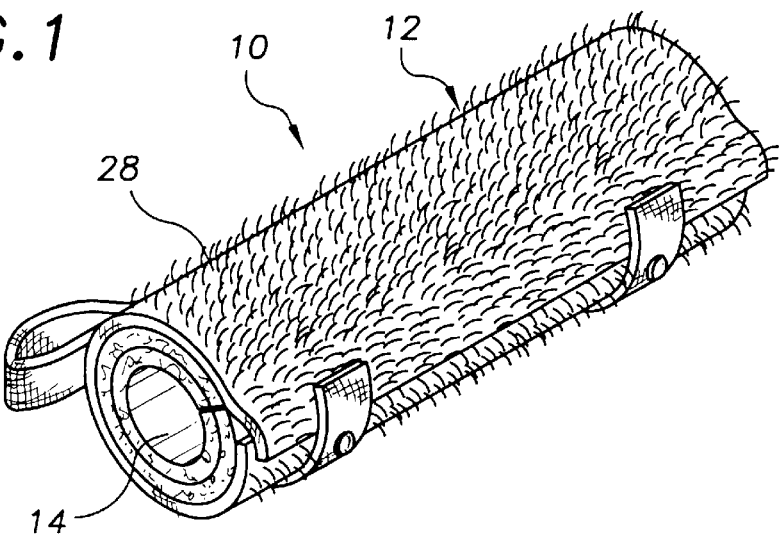
FIG. 1 is an isometric view of the universal cake remover.

In operation, the device is inserted into a hot oven to clamp to the top edge of a hot bake pan, thereby allowing the hot bake pan to be withdrawn from the hot oven while the user is gripping the device's ergonomic handle. It is not necessary to handle the hot pan and all movement of the hot pan is accomplished by use of the device. The device's circular planar member is substantially round and has two clamping blocks positioned on one side while the other side is flat for laying on a table surface. The clamping blocks are opposed to one another providing space between them for inserting the baking pan top edge. One clamping block is slidable on the circular member and has a spring biasing the slidable clamping block to the clamping position when a pan is in position. The spring may also be activated or locked by operation of an engagement/disengagement means attached to an ergonomic handle which extends from the circular planar member. This allows the clamping mechanism to be operated from the handle keeping the user's hand away from the hot pan. After the pan is clamped and withdrawn from the hot oven, the pan is maintained in the clamped position and, if desired, the pan can be inverted while the device back side is laid flat on a table surface. The inversion allows gravity to remove the cake from the hot baking pan. The cake pan is then unclamped from the device and the cake, which is now laying on the device, can be transferred to a serving platter of the like.

It can be seen from the preceding description and illustrations that the circular planar member 20 is circular shaped to the general sized of a cake bake pan. The circular member has a top surface 21 and a flat bottom surface 22 Construction material of the circular member 20 may include wood, plastic, metal, aluminum, or any other durable material. Preferably, the top surface is coated or constructed of nonstick material, such as TEFLON, polished stainless steel or other suitable nonstick material. The circular member 20 includes a centrally located aperture 30 which functions to allow the tube of a tube type cake pan to extend therethrough when the device is over the top of the pan. Two handles are also constructed integrally with the circular member 20. A primary handle 40 which extends approximately eight to about fourteen inches from the outer edge of the circular member is provided for extending the reach of the device into a hot oven, while a secondary handle 41 is positioned opposite the primary handle and functions as a secondary support to help the user with the weight of the device along with a clamped cake pan.

Clamping blocks 10 are positioned on the top surface 21 of the circular member 20 and function to clamp to a top edge outer surface 15 of the bake pan to be removed, as illustrated in FIG. 1. Although the figures depict two clamping blocks, there may be more clamping blocks as long as their positioning allows for adjustment to be made to accommodate different diameter baking pans. The preferred number of clamping blocks as illustrated includes a stationary mounted clamping block 25 and slidable mounted clamping block 27. The stationary mounted clamping block is mounted near the secondary handle 41 while the slidable clamp 27 is opposed and slides towards the center of the circular member 20 along slide grooves 23 which are made into the circular member top surface 21. The slidable clamp 27 is also attached to a slide rod 26 which extends to the primary handle 40 while an actuating spring 28 is positioned on the end of the slide rod 26 and functions to urge the rod and the slidable clamp 27 toward the center of the circular member 20. A pull ring 29 is provided at the end of the rod 26 to assist the user in releasing the clamping block 27 from the cake pan.

The primary handle 40 is preferably constructed of heat resistant material and ergonomically designed for easy and comfortable use of the device.

It is noted that the embodiment of the universal cake turner described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A universal cake turner used for both removing a bake pan from an oven and for removing a cake from the pan, comprising:
   a) a flat circular planar base member having a top surface and a bottom surface, further having a diameter equal to or larger than a diameter of a bake pan top edge,
   b) a handle member extending from said base member and fixedly secured to the base member, and
   c) a means for clamping the bake pan top edge to the base member top surface comprising a fixed clamping block attached to the base member top surface and a slidable clamping block positioned to slide linearly on the base member top surface along a line from the handle member to a center point of the circular base member, the clamping blocks further being positioned opposite one another on the base member top surface providing opposed clamping surfaces.

2. The universal cake turner of claim 1, wherein the circular planar member further comprises a centrally located aperture which allows for the use of the universal cake turner with a tube type baking pan, further the aperture being dimensioned so that when the universal cake turner is placed on the top edge of a tube type baking pan, a center tube will extend into the aperture and allow the pan top edge to lay flat on the circular member.

3. The universal cake turner of claim 1, wherein the slidable clamping block further includes a spring loaded slidable rod which is biased with a spring to urge the slidable clamping block toward a center of the circular planar member.

4. The universal cake turner of claim 1 wherein the handle member is fitted with heat barrier material.

5. The universal cake turner of claim 1 wherein the circular planar member further comprises a secondary lifting handle positioned opposite of the handle member providing a means for using a second hand to lift the universal cake turner and a cake.

6. The universal cake turner of claim 1 wherein the circular planar member is constructed of nonstick material allowing a cake to be removed from the planar member without sticking.

7. A universal cake turner used for both removing a bake pan, including a tube type bake pan, from an oven and for removing a cake from the pan, comprising:
   a) a flat circular planar base member having a top surface and a bottom surface, a centrally located aperture having a diameter larger than the tube of a tube type bake pan, while the circular member has a diameter equal to or larger than a diameter of a bake pan top edge,
   b) a handle member extending from said base member and fixedly secured to the base member, and a secondary handle positioned opposite the handle member, while the handle member is fitted with heat barrier material, and
   c) a means for clamping the bake pan top edge to the base member top surface comprising a fixed clamping block attached to the base member top surface and a spring loaded slidable clamping block positioned to slide linearly on the base member top surface along a line from the handle member to a center point of the circular base member and a spring biased to urge the slidable block to a clamping position, the clamping blocks further being positioned opposite one another on the base member top surface providing opposed clamping surfaces.

\* \* \* \* \*

UNITED STATES PATENT AND TRADEMARK OFFICE
CERTIFICATE OF CORRECTION

PATENT NO. : 5,967,576
DATED : Oct. 19, 1999
INVENTOR(S) : Ruth Andrews, Jesse J. Andrews Page 1 of 2

Figure 2:
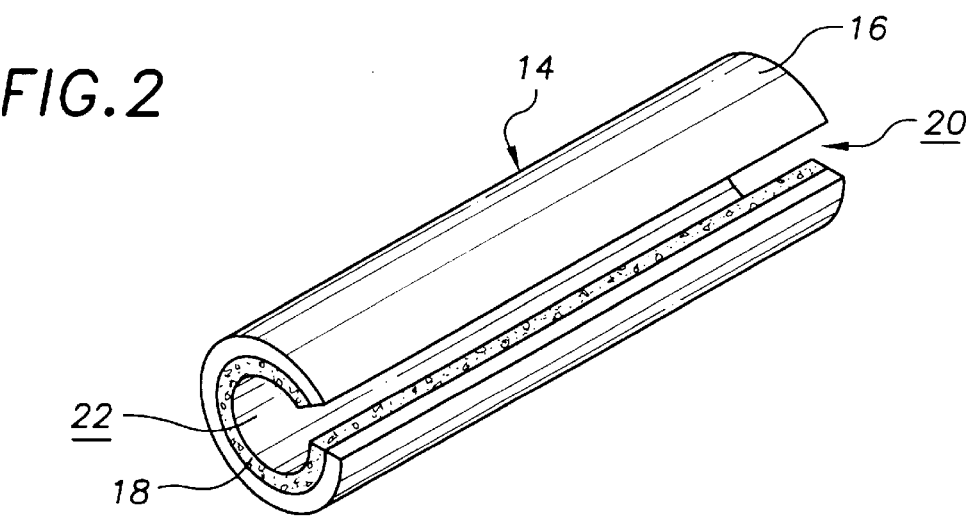
FIG. 2 is a side view of the universal cake remover with a tube cake pan clamped and inverted by the device.
Figure 3:
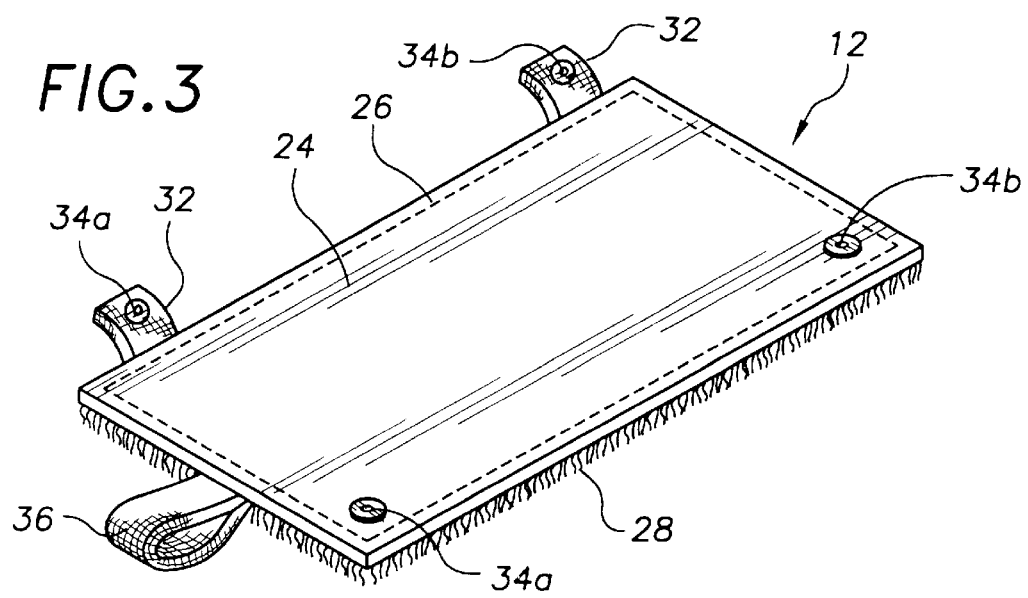
FIG. 3 is a top view of the universal cake remover.
Figure 1:
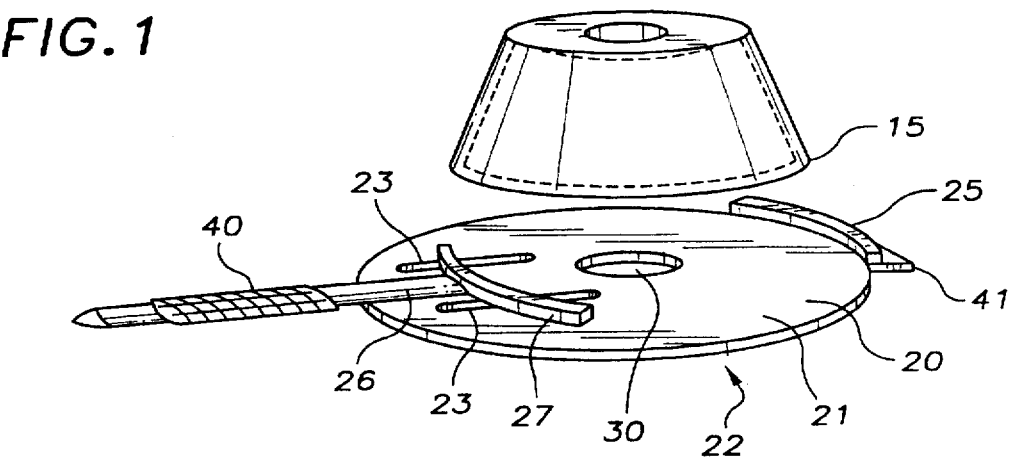
Figure 2:
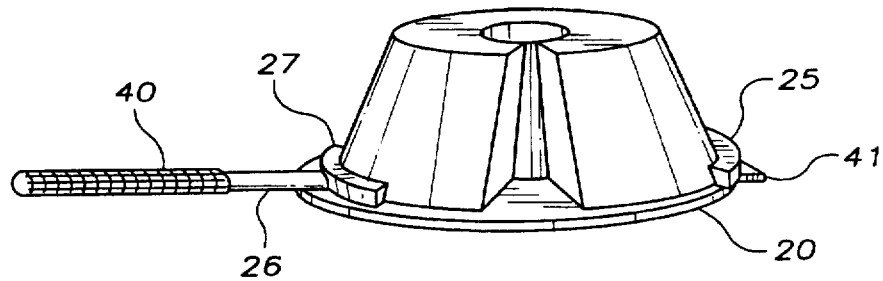
Figure 3:
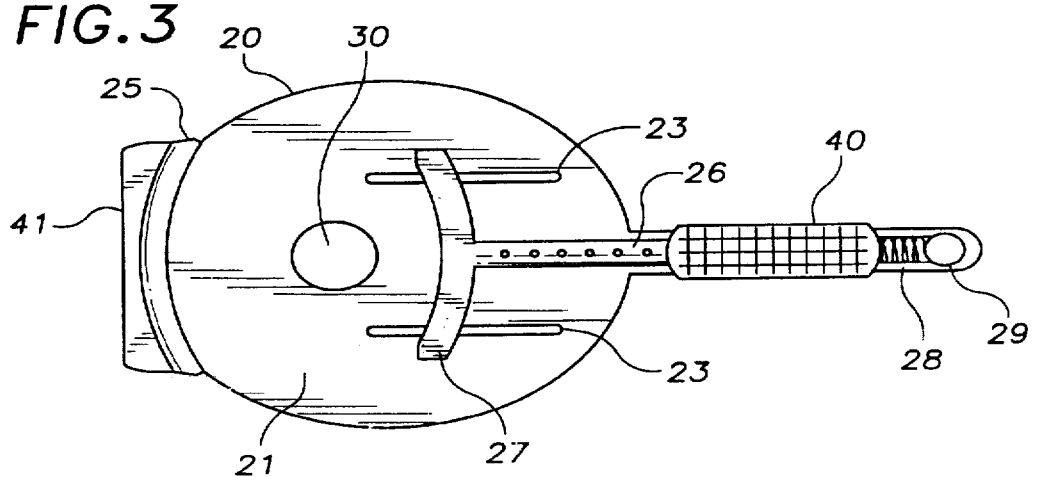

It is certified that error appears in the above-identified patent and that said Letters Patent is hereby corrected as shown below:

Cancel drawing Figures 1-3 and replace them with correct drawing Figures 1-3 appended hereto.

Signed and Sealed this

Seventeenth Day of April, 2001

Attest:

NICHOLAS P. GODICI

Attesting Officer     Acting Director of the United States Patent and Trademark Office